US008892447B1

(12) United States Patent
Srinivasan et al.

(10) Patent No.: US 8,892,447 B1
(45) Date of Patent: Nov. 18, 2014

(54) QUALITY ASSESSMENT OF TEXT DERIVED FROM AN AUDIO SIGNAL

(75) Inventors: Krishnan Srinivasan, San Jose, CA (US); Thomas P. Apone, Sharon, MA (US); Bradley C. Botkin, Acton, MA (US)

(73) Assignee: Nuance Communications, Inc., Burlington, MA (US)

(*) Notice: Subject to any disclaimer, the term of this patent is extended or adjusted under 35 U.S.C. 154(b) by 493 days.

(21) Appl. No.: 13/281,304

(22) Filed: Oct. 25, 2011

(51) Int. Cl.
*G10L 21/00* (2013.01)

(52) U.S. Cl.
USPC ............ 704/277; 704/2; 704/270; 704/260; 704/257

(58) Field of Classification Search
CPC . G06F 17/2854; G06F 17/289; G06F 17/273; G06F 17/274; G09B 5/06; G09B 19/06; G09B 19/04; G09B 7/02; G10L 15/063; G10L 15/065; G10L 13/043; G10L 15/822; G10L 25/48; G10L 15/1822; G10L 21/043
USPC ........... 704/2, 4, 5, 7, 8, 9, 10, 270, 257, 233, 704/277, 260, 235, 228; 705/7.13, 80, 347, 705/234; 434/157; 706/25; 709/206; 707/752
See application file for complete search history.

(56) References Cited

U.S. PATENT DOCUMENTS

| | | | | |
|---|---|---|---|---|
| 6,928,407 B2 * | 8/2005 | Ponceleon et al. | ............ | 704/253 |
| 7,043,433 B2 * | 5/2006 | Hejna, Jr. | ............ | 704/270 |
| 8,230,343 B2 * | 7/2012 | Logan et al. | ............ | 715/723 |
| 8,478,599 B2 * | 7/2013 | Hejna, Jr. | ............ | 704/270 |
| 2003/0187642 A1 * | 10/2003 | Ponceleon et al. | ............ | 704/252 |
| 2010/0228548 A1 * | 9/2010 | Liu et al. | ............ | 704/251 |
| 2010/0299147 A1 * | 11/2010 | Stallard | ............ | 704/235 |
| 2010/0318355 A1 * | 12/2010 | Li et al. | ............ | 704/244 |
| 2011/0313757 A1 * | 12/2011 | Hoover et al. | ............ | 704/9 |
| 2012/0116749 A1 * | 5/2012 | Choi et al. | ............ | 704/2 |
| 2012/0329013 A1 * | 12/2012 | Chibos | ............ | 434/157 |
| 2013/0024184 A1 * | 1/2013 | Vogel et al. | ............ | 704/9 |

* cited by examiner

*Primary Examiner* — Vijay B Chawan
(74) *Attorney, Agent, or Firm* — Chapin IP Law, LLC

(57) ABSTRACT

According to example configurations, a translation quality assessment application (e.g., system) receives a set of text derived from a translation of an audio signal. The translation quality assessment application aligns and compares the received set of text to reference text to identify occurrence of speech-to-text translation errors in the set of text. For each of the errors, the translation quality assessment application identifies a type associated with the error and retrieves an appropriate weighted coefficient. For example, the translation quality assessment application produces a respective weighted value for each error based on the weighted coefficients. A magnitude of each of the weighted values varies depending on a type of the error that occurred during the translation. The translation quality assessment application utilizes the weighted values to generate a metric indicating a level of quality of the set of captioned text with respect to the set of reference text.

22 Claims, 9 Drawing Sheets

| Category | Severity | Example | Example Coefficient Value |
|---|---|---|---|
| Substitutions | | | |
| Singular/Plural | Low | man/men | 0.05 |
| Tense | Low | run/ran | 0.05 |
| Nominal/Pronoun | Low | This man/<Proper name> | 0.05 |
| Punctuation | Low | Period instead of question mark | 0.05 |
| Split Compound Words | Low | foot note/footnote did not/didn't | 0.05 |
| Homophone or Slight Misspelling | High | sale/sail work/werk | 0.85 |
| Substitute Wrong Word | High | blogger/hunger | 0.75 |
| Not a valid word but has phonetic similarity | High | human milating/humiliating | 0.85 |
| Garbled syllables/random letters not words | High | Igbavboa | 0.75 |
| Word boundary error (also stacking error) | High | Paying backpack Stan/paying back Pakistan | 0.85 |
| Transmission: garbling, substitution, dropped letters | High | GM sto/GM stock random characters white boxes | 0.85 |
| Insertions | | | |
| Two words for one (wrong) | High | might yes/mighty | 0.85 |
| Duplicate word/minor insertion | Low | criticism criticism | 0.22 |
| Word order/transposition | Medium | Would I/I would | 0.55 |
| Correction by steno | Medium | disznlt - dissidants | 0.45 |
| Deletions | | | |
| Dropped word(s): 1-2 (minor, aside) | Low | You know | 0.15 |
| Dropped words: 3 (or significant) | Low | Figure out what the best options are going to be | 0.15 |

FIG. 2

QUALITY ASSESSMENT OF TEXT DERIVED FROM AN AUDIO SIGNAL

BACKGROUND

Real-time captioned news is a lifeline service for people who are deaf or hard of hearing, providing critical information about their local communities, national events and emergencies. Captioning mandates designed to provide equal access to television have resulted in rapid growth of the so-called caption industry. A shortage of skilled real-time steno-captionists, and the downward pressure on rates by program providers, has made the low quality of live captioning of news broadcasts a growing issue.

Disability organizations have filed complaints and a formal petition with the Federal Communications Commission (FCC), which reflects frustration with chronic problems related to live captioning quality, transmission errors, and lack of industry response to their concerns. Without a way of accurately measuring quality of captions, the FCC, consumers, and broadcasters have no efficient method of tracking and improving so-called steno-caption accuracy performance.

One conventional way of measuring the accuracy of closed-caption text derived from a respective audio signal is to use a conventional word error rate. As its name suggests, conventional word error rate algorithms first identify a total number of spoken words in the audio signal that are not properly translated into corresponding text. Additionally, conventional word error rate algorithms divide the number of detected word errors by the total number of words.

The word error rate can be presented as a percentage value, which indicates a degree to which words in the audio signal are properly converted into text. For example, a relatively high word error percentage rate therefore indicates low accuracy of converting the audible signal into respective text. Conversely, a low word error percentage rate indicates high accuracy of converting the audible signal into respective text. Of course, higher word accuracy is desirable to ensure that the closed-caption text produced for respective video is intelligible.

BRIEF DESCRIPTION

Use of the conventional word error rate metric to indicate accuracy of a speech-to-text translation as discussed above suffers from deficiencies. For example, there are many different types of speech-to-text translation errors that can occur during a respective translation. The conventional metric typically does not accurately reflect how well the speech is translated because each of the errors, regardless of severity of the error, is given equal weighting in the word error metric.

Embodiments herein deviate with respect to conventional techniques as discussed above. For example, one embodiment herein includes utilizing a translation quality assessment application to produce a more useful metric indicating respective quality or accuracy of a speech-to-text translation.

For example, in accordance with one embodiment, for each of multiple different types of possible speech-to-text translation errors that can occur during speech-to-text translation, a translation quality assessment application stores a weighted coefficient value. Magnitudes of the stored coefficients vary and indicate a degree to which a speech-to-text improper translation error impacts comprehension of a set of text translated from audio.

In accordance with one embodiment, a translation assessment application (or system) receives a set of text derived from translation of an audio signal. To determine an accuracy of the speech-to-text translation, the translation assessment application first compares the set of text to reference text to identify errors in the set of text. In one embodiment, the reference text is assumed to be a very high quality if not perfect translation of audio into text.

For each of the identified errors, the translation assessment application produces a respective weighted value based on use of a weighted coefficient for the type of detected errors. More specifically, upon detecting occurrence of a particular error in translation of an audio signal into a set of text, the translation assessment application identifies an error type associated with the particular error that occurs. The translation assessment application maps and then retrieves an appropriate coefficient for the particular error. The translation assessment application utilizes the retrieved coefficient for the type of error to produce a weighted value for the particular error.

As mentioned, the retrieved coefficient and corresponding generated weighted value for the particular error indicates a degree to which the particular error impacts comprehension of the set of text. For example, higher weighted values can indicate a more severe type of error affecting intelligibility of the text; lower weighted values can indicate a less severe type of error affecting intelligibility of the text.

The translation assessment application can be configured to repeat the process of producing weighted values for each of the errors that occur during the speech-to-text translation. Accordingly, each error identified in translation is assigned a weighted value representative of a degree to which the error affects quality of the translation.

The translation assessment application then utilizes the weighted values to generate a metric indicating a relative level of quality of the set of captioned text with respect to the reference text. For example, in one embodiment, the translation assessment application produces the metric based at least in part on a summation of the weighted values for the detected errors. In yet a further embodiment, the translation assessment application divides the summation of weighted values by a total number of words in the reference text to produce a novel, weighted word error rate.

Thus, in one embodiment, in contrast to generating a conventional word error rate in which the word error rate is based on a mere percentage of improperly translated words, embodiments herein include generating a word error rate based on the weighted values. As discussed, a weight value of each of the errors in the speech-to-text translation varies depending on the type of error and corresponding applied coefficient. For example, translation errors such as splitting of a compound word, improper verb tense, etc., may be relatively minor and be assigned lower coefficient values (and thus may be assigned lower weighted values when calculating the word error rate) whereas word substitution errors such as incorrect words, missing letters, etc. may be relatively severe and may be assigned higher coefficient values (and thus may be assigned higher weighted values when calculating the word error rate).

By way of a non-limiting example, the translation assessment application as discussed herein, including the weighting of different types of speech-to-text translation errors depending on type, provides an accurate translation performance measurement tool for analyzing the quality of real-time captioning. In such an embodiment, the translation assessment application greatly improves the ability to monitor and maintain the quality of live captioning generated for viewers who are deaf or hard of hearing. Although, note again that embodiments herein can be used in applications other than closed-caption text generation and assessment.

As discussed above, techniques herein are well suited for use in software and/or hardware applications implementing quality assessment of speech-to-text translation. However, it should be noted that embodiments herein are not limited to use in such applications and that the techniques discussed herein are well suited for other applications as well.

These and other embodiments are discussed in more detail below.

As mentioned above, note that embodiments herein can include a configuration of one or more computerized devices, workstations, handheld or laptop computers, or the like to carry out and/or support any or all of the method operations disclosed herein. In other words, one or more computerized devices or processors can be programmed and/or configured to operate as explained herein to carry out different embodiments of the invention.

Yet other embodiments herein include software programs to perform the steps and operations summarized above and disclosed in detail below. One such embodiment comprises a computer program product including a non-transitory computer-readable storage medium (i.e., any type of hardware storage medium) on which software instructions are encoded for subsequent execution. The instructions, when executed in a computerized device having a processor, program and/or cause the processor to perform the operations disclosed herein. Such arrangements are typically provided as software, code, instructions, and/or other data (e.g., data structures) arranged or encoded on a non-transitory computer readable storage medium such as an optical medium (e.g., CD-ROM), floppy disk, hard disk, memory stick, etc., or other a medium such as firmware or microcode in one or more ROM, RAM, PROM, etc., or as an Application Specific Integrated Circuit (ASIC), etc. The software or firmware or other such configurations can be installed onto a computerized device to cause the computerized device to perform the techniques explained herein.

Accordingly, one particular embodiment of the present disclosure is directed to a computer program product that includes a computer readable storage medium having instructions stored thereon for analyzing a quality of converting of an utterance to corresponding text. For example, in one embodiment, the instructions, when executed by a processor of a respective computer device, cause the processor to: receive a set of text derived from a speech-to-text translation of an audio signal; compare the set of text to reference text to identify errors in the received set of text; producing a respective weighted value for each of the errors, a magnitude of each of the weighted values varying depending on a type of the error occurring at translation; and utilize the weighted values to generate a metric indicating a level of quality of the set of text with respect to the reference text.

The ordering of the steps has been added for clarity sake. These steps can be performed in any suitable order.

Other embodiments of the present disclosure include software programs and/or respective hardware to perform any of the method embodiment steps and operations summarized above and disclosed in detail below.

It is to be understood that the system, method, apparatus, instructions on computer readable storage media, etc., as discussed herein can be embodied strictly as a software program, as a hybrid of software and hardware, or as hardware alone such as within a processor, or within an operating system or a within a software application. Example embodiments of the invention may be implemented within products and/or software applications such as those manufactured by Nuance Communications, Inc., Burlington, Mass., USA.

Additionally, although each of the different features, techniques, configurations, etc., herein may be discussed in different places of this disclosure, it is intended that each of the concepts can be executed independently of each other or, where suitable, the concepts can be used in combination with each other. Accordingly, the one or more present inventions as described herein can be embodied and viewed in many different ways.

Also, note that this preliminary discussion of embodiments herein does not specify every embodiment and/or incrementally novel aspect of the present disclosure or claimed invention(s). Instead, this brief description only presents general embodiments and corresponding points of novelty over conventional techniques. For additional details and/or possible perspectives (permutations) of the invention(s), and additional points of novelty, the reader is directed to the Detailed Description section and corresponding figures of the present disclosure as further discussed below.

BRIEF DESCRIPTION OF THE DRAWINGS

The foregoing and other objects, features, and advantages of the invention will be apparent from the following more particular description of preferred embodiments herein, as illustrated in the accompanying drawings in which like reference characters refer to the same parts throughout the different views. The drawings are not necessarily to scale, with emphasis instead being placed upon illustrating the embodiments, principles, concepts, etc.

FIG. 2 is an example diagram illustrating a mapping of different types of word errors to coefficient values according to embodiments herein.

DETAILED DESCRIPTION

As discussed herein, a translation quality assessment system receives a set of text derived from a translation of an audio signal. The translation quality assessment system compares the received set of text to reference text to identify occurrence of speech-to-text translation errors in the set of text. For each of the detected errors, the translation quality assessment system identifies a type associated with the error and retrieves an appropriate weighted coefficient. The translation quality assessment system maps the error types to corresponding coefficient values. The translation quality assessment system produces a respective weighted value for each error based on the weighted coefficients. A magnitude of each of the weighted values varies depending on a type of the error that occurred during the translation. In one embodiment, the translation quality assessment system utilizes the weighted values to generate a metric indicating a level of quality of the set of captioned text with respect to the set of reference text.

Figure 1:
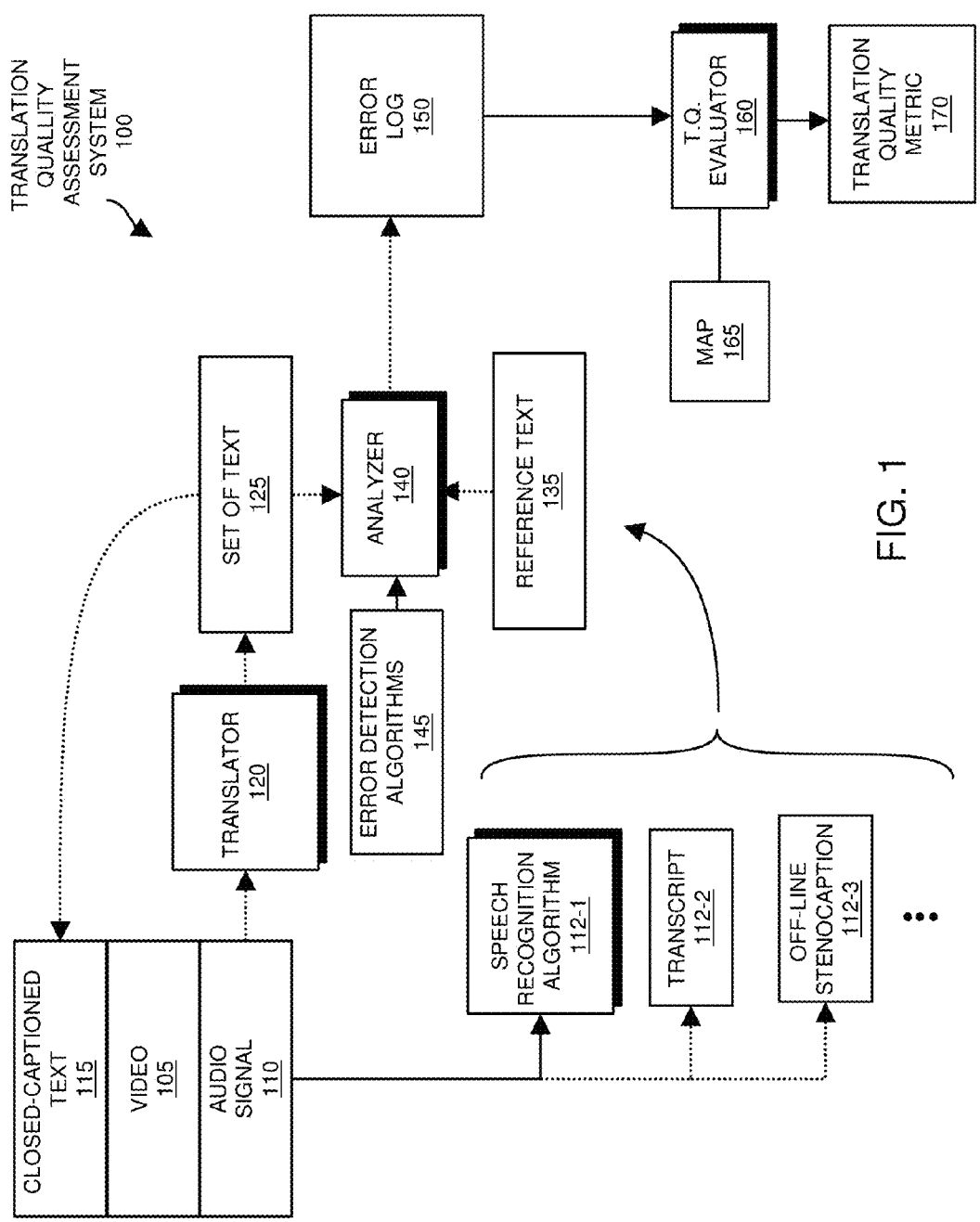
FIG. 1 is an example diagram of a translation quality assessment application/system according to embodiments herein.

FIG. 1 is an example diagram illustrating a translation quality assessment system according to embodiments herein.

As mentioned, one embodiment herein includes implementing a translation quality assessment system 100 (or application) to produce a useful translation quality metric 170. The translation quality metric 170 indicates a respective quality or accuracy of translating audio signal 110 into corresponding text such as set of text 125. Reference text 135 can provide a baseline in which to assess the quality of translation associated with set of text 125.

In one embodiment, audio signal 110 is associated with video 105. As shown, the video data 105 and corresponding audio signal 110 can be broadcasted to multiple viewers for respective playback.

The translator 120 converts or translates the audio signal 110 into set of text 125. The set of text 125 can be stored as closed-caption text 115 that is broadcasted to viewers along with the video 105 and audio signal 110. Accordingly, a respective viewer can select a mode in which the closed-caption text 115 is simultaneously displayed on a display screen along with playback of video 105. Under such conditions, the viewer is able to read the closed-caption text 115 as an alternative to listening to playback of audio signal 110 while viewing video 105.

By way of non-limiting example, the translator 120 can be a steno-captionist that translates the audio signal 110 in substantially real-time as the video 105 is broadcasted to one or more viewers. The set of text 125 can be transmitted in substantially real-time and displayed by respective viewers as discussed above. In one embodiment, the set of text 125 produced in substantially real-time is closed-captioned text 115 that is forwarded and played back by viewers along with video 105.

In accordance with other embodiments, note that the translation by translator 120 need not be performed in substantially real-time as video 105 is streamed to viewers. Instead, translation of the audio signal 110 can occur at any time.

As discussed herein, one embodiment includes generating a respective translation quality metric 170 to indicate a relative quality associated with translation of the audio signal 110 into respective set of text 125.

Prior to analyzing the set of text 125 or closed-captioned text 115 for accuracy, reference text 135 is first identified or chosen. The reference text 135 can be derived by any of one or more sources such as a speech recognition algorithm 112-1 (executed on a computer). In such an embodiment, the speech recognition algorithm 112-1 translates the audio signal 110 into reference text 135. As mentioned, the reference text 135 provides a baseline in which to measure accuracy of the translation associated with audio signal 110 into set of text 125. That is, as its name suggests, the reference text 135 is used as a reference by which the quality of the translation is measured.

In accordance with other embodiments, the reference text can be generated and/or retrieved from a transcript 112-2 (e.g., a substantially exact transcript) of the audio signal 110, an off-line generated steno-caption 112-3 of the audio signal 110, etc.

The analyzer 140 of translation quality assessment system 100 thus receives a set of text 125 derived from a translation of audio signal 110. To determine an accuracy of the speech-to-text translation of the audio signal 110 into set of text 125, the analyzer 140 of the translation quality assessment system 100 first compares the set of text 125 and reference text 135 to identify respective errors in the set of text 125.

There are different types of translation errors that can occur during translation by translator 120. For example, as will be discussed later in this specification, translation errors can include substitutions, deletions, and insertions. Within each of these categories of errors, there are many different types of errors that can impact the comprehensibility of a translation. Examples of the different types of errors are more particularly shown and discussed with respect to FIG. 2.

Referring again to FIG. 1, during the compare process, the analyzer 140 first aligns the words, phrases, etc., in the set of text 125 to the reference text 135. Subsequent to alignment, the analyzer 140 then applies the error detection algorithms 145 to detect occurrence of the different types of possible substitution errors, deletion errors, and insertion errors.

The analyzer 140 logs the occurrence of each detected error in error log 150. Analyzer 140 applies and executes error detection algorithms 145 to detect the different types of errors.

For each detected error, the analyzer 140 can store appropriate information such as the location in the reference text and/or the set of text 125 where the error occurred, the type of detected error, etc.

Subsequent to identifying the translation errors and respective types of error, the translation quality evaluator 160 generates the translation quality metric 170 based on a weighting of error values generated for each of the detected errors. In one embodiment, the detected errors in error log 150 are assigned different weights depending on the coefficients for the different types of errors detected. Translation quality evaluator 160 maps the detected different types of errors to coefficient values via use of map 165. As will be discussed in more detail later in this specification, the translation quality evaluator 170 utilizes the weighted coefficients to generate translation quality metric 170.

FIG. 2 is an example diagram illustrating a coefficient map 165 according to embodiments herein. As shown, each of the different types of errors in the map 165 has a different effect on comprehensibility by different amounts as shown. That is, certain types of translation errors more significantly affect comprehension of the text while other types of translation errors have less of an affect on comprehension.

In one embodiment, for each of multiple different types of possible speech-to-text translation errors that can occur during speech-to-text translation, the translation quality assessment system 100 stores a weighted error coefficient value in map 165. Magnitudes of the stored error coefficient values vary and indicate a degree to which a speech-to-text translation error impacts comprehension of a generated set of text.

As an example, a singular/plural substitution such as substituting the word "men" with "man" in a respective translation is a relatively minor error. Accordingly, the example error coefficient value (e.g., 0.05) associated with a singular/plural substitution is relatively small.

Conversely, a wrong word substitution error such as substituting of the word "blogger" with "hunger" in a respective translation is a relatively severe error having a greater impact on comprehension. Accordingly, the example error coefficient value (e.g., 0.85) associated with a wrong word substitution is relatively high.

As a further example, a word order error or transposition error such as improperly inserting "would I" instead of "I would" in a respective translation is a moderately severe error. Accordingly, the example error coefficient value (e.g., 0.55) associated with a word order error is a mid-range value.

Note that the coefficient values selected for the different types of errors presented in map 165 are shown by way of non-limiting example only. According to different embodiments, the coefficient values for the different types of errors can be selected from a range of values depending on severity of the type of error. Further, by way of a non-limiting example, when coefficients are chosen within a range of 0.0 to 1.0, the coefficient values for low severity errors can be selected from a range between 0.0 and 0.4; the coefficient values for medium severity errors can be selected from a range between 0.3 and 0.7; the coefficient values for high severity errors can be selected from a range between 0.6 and 1.0. Thus, the map 165 can include an assignment of any suitable coefficient value to each of the different types of errors. As discussed, the assigned weighted coefficients can be any suitable value inside or outside the range of 0.0 and 1.0.

Referring again to FIG. 1, for each of the errors in error log 150, the translation quality evaluator 160 of the translation quality assessment system 100 produces a respective weighted value based on use of the weighted coefficients in FIG. 2.

For example, the translation quality evaluator 160 of the translation quality assessment system 100 identifies a type associated with each particular error and then retrieves an appropriate coefficient from map 165 for each particular error. The translation quality evaluator 160 of the translation quality assessment system 100 utilizes the retrieved coefficient for the corresponding type of error to produce a weighted value for the particular error. For example, in one embodiment, instead of counting an identified error as a value of 1 (e.g., one error), the translation quality evaluator 160 adjusts the weight of each error based on the error coefficient values in map 165. For example, each singular/plural substitution error in a translation is assigned a weighted value of 0.05; each substitution of a wrong word in a translation is assigned a weighted value of 0.75; each word order insertion error is assigned a weighted value of 0.55; and so on as shown. As mentioned, each of the coefficient values assigned to each of the different types of errors can be any value between 0 and 1.

Accordingly, the retrieved error coefficient value and corresponding generated weighted value for a particular error indicates a degree to which the particular error impacts comprehension of the set of text 125. For example, higher weighted values indicate a more severe type of error affecting intelligibility of the text; lower weighted values can indicate a less severe type of error affecting intelligibility of the text.

The translation quality assessment system 100 repeats the process of producing weighted values for each of the errors that occur during the speech-to-text translation using the retrieved coefficient values for the identified errors. The translation quality evaluator 160 then utilizes the weighted values to generate translation quality metric 170 indicating a relative level of quality of the set of text 125 with respect to the reference text 135. For example, in one embodiment, the translation assessment application/system produces the translation quality metric 170 based at least in part on a summation of the weighted values for the errors. In one embodiment, as mentioned, the translation quality evaluator 160 is configured to divide the summation (or weighted values) by a total number of words in the reference text to produce a novel, weighted word error rate.

Thus, in one embodiment, in contrast to generating a conventional word error rate in which the word error rate is based on a percentage of improperly translated words without regard to weight including, embodiments herein include generating a word error rate based on the weighted coefficients and weighted values. Based on generation of a conventional word error rate, each word error that occurs during translation is weighted as a value of one. In contrast to the conventional word error rate, as discussed herein, a weight of each of the errors in the speech-to-text translation varies depending on the type of error.

The translation quality assessment system 100 provides a more accurate assessment of quality than conventional applications because conventional calculation of word error rates do not take into account that different errors have a different impact on comprehensibility of text derived from a translation. Use of map 165 and the error coefficient values as discussed herein and generation of the translation quality metric 170 greatly improves the ability to monitor and maintain the quality of translation, especially text derived from live captioning generated for viewers who are deaf or hard of hearing.

Example Generation of Weighted Word Error Rates

A basic calculation for Word Error Rate (WER) has been in use for some time, in large part due to the growth of speech recognition technology. In this approach a "hypothetical" or test transcript (captions, in our case) is compared to a "reference" transcript (an substantially exact transcript of what was actually spoken).

As previously discussed, most if not all types of translation errors can be categorized in one of three ways:

Substitution (S)—one (incorrect) word has been substituted for a correct word.

Deletion (D)—one word has been deleted or omitted from the "hypothetical" transcript.

Insertion (I)—one word has been inserted into the "hypothetical" transcript that was not spoken.

Each of these categories of errors can be further subdivided into different types as previously discussed.

As discussed herein, the conventional word error rate metric does not always adequately reflect the quality of a transcript because it treats all errors the same.

Here are some examples to consider, taken from actual newscasts. In these examples, the top line is what was spoken (e.g., audio signal 110); the second line is what appeared in the captions (e.g., set of text 125).

(reference text 135) THIS PROCESS WILL BE QUICK.
(set of text 125) THIS PROSWILLING QUICK.

In this case, with the nonsense word "PROSWILLING," a reader would likely be very confused and unable to make much sense of the set of text 125.

To calculate a translation quality metric 170 for this example text, the translation quality assessment system 100 first aligns the reference text and the set of text 125, lining up correct words that match:

(reference text 135) THIS PROCESS WILL BE QUICK.
(set of text 125) THIS PROSWILLING **  QUICK.
                     S  D D Alignment makes it possible to more easily detect an error. In this example, there is one substitution (i.e., "PROSWILLING" that has been substituted for "PROCESS") and two deletions (i.e., WILL and BE have been left out).

According to conventional techniques, the WER would be based on 3 errors out of 5 words, and would be 60% Word Error Rate.

In contrast, according to embodiments herein, the each deleted word (e.g., WILL and BE) have assigned coefficients of 0.15. The substitute word (e.g., PROSWILLING) has a coefficient of 0.75. The translation quality metric 170 is therefore:

(0.15+0.15+0.75)/5=1.05/5=21%

In accordance with another example, the reference text 135 and set of text 125 (as labeled below) can be as follows:

(135) SMOKING DEATH RATES HAVE CONTINUED TO INCREASE
(125) THE SMOKING DEATH RATE HAS INCREASED

In this case, the caption (e.g., translation) is understandable and captures the gist of the words uttered in the audio signal 110, though there is clearly more information (e.g., text) in the reference text 135.

To assess translation quality, embodiments herein include aligning the texts and tag the errors as follows:
(135) *** SMOKING DEATH RATES HAVE CONTINUED TO INCREASE
(125) THE SMOKING DEATH RATE HAS *************
** INCREASED
   I S S D D S There are 6 word errors out of 7 words. The conventional word error rate would be (6/7) or approximately 85%. In this case, the substitutions and deletions are minor and, clearly, this caption is more accurate than the previous example, so a better way of calculating error rates is desirable.

The weighted Word Error Rate as discussed herein correlates well with the conventional calculation of word error rate, but better reflects the accuracy of a caption transcript. According to embodiments herein, as mentioned, many errors are considered relatively minor; such errors are given a lower weight value when calculating the word error rate. In one embodiment, the word error rate calculation according to embodiments herein accounts for conditions such as paraphrasing. For example, as long as key words in a corresponding translation are accurate, minor changes like reordering of words and phrases, changes in tense, or dropping extra adjectives also end up with lower weights in the novel generation of the word error rate calculation.

For the above example about smoking death rates, the weighted word error rate is calculated as follows using coefficients in map 165:

1 insertion—error type 7=0.22 (weighted value=0.22 per word error of this type)

1 singular/plural—type 1=0.05 (weighted value=0.05 per word error of this type)

2 wrong tense—type 2=2*0.05=0.1 (weighted value=0.05 per word error of this type)

2 drops (minor)—type 10=2*0.15=0.30 (weighted value=0.15 per word error of this type)

Weighted WER=(0.22+0.05+0.10+0.30)/7=0.67/7=9.57%

Calculation of a conventional word error rate for the above sample translation would be 85% (e.g., 6 total word errors divided by 7 total words). In contrast, according to embodiments herein, the calculation of the weighted word error rate as 9.57% is a better reflection of the overall quality of the sentence as the intended meaning of the original audio signal 110 is well captured by the set of text 125. In other words, the conventional word error rate of 85% would appear to indicate that the quality of translation is remarkably poor, while in reality the translation is quite accurate. The weighted word error rate calculated according to embodiments herein is a better reflection of the translation accuracy.

Figure 3:
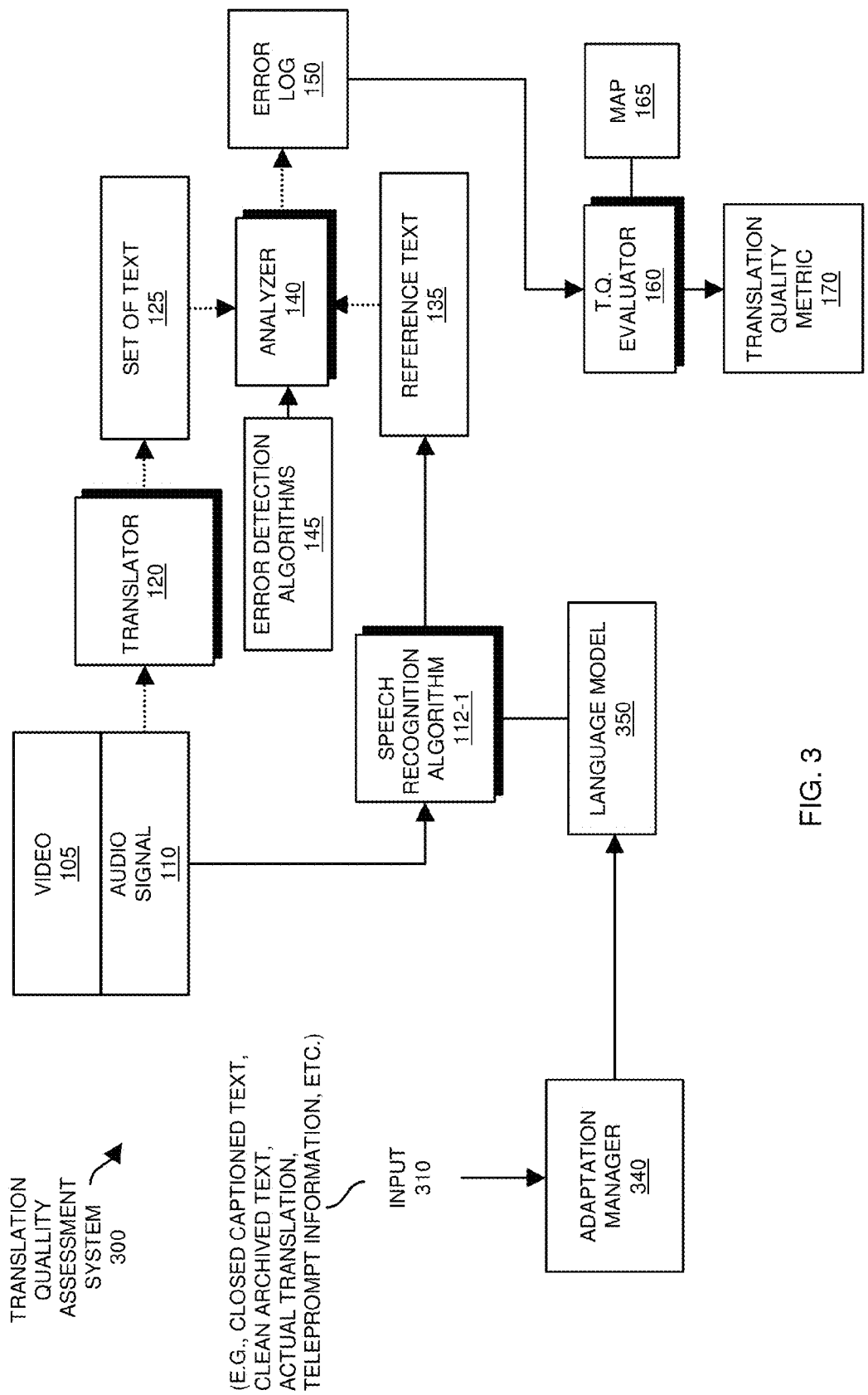
FIG. 3 is an example diagram illustrating adaptation of a respective language model based on use of one or more different types of inputs according to embodiments herein.

FIG. 3 is an example diagram illustrating a technique of improving accuracy of producing reference text 135 according to embodiments herein.

As an example, recall that speech recognition algorithm 112-1 can be used to generate reference text 135. Use of the speech recognition algorithm 112-1 (e.g., an automatic translation algorithm) may be desirable over alternative methods because little human labor is required to perform the translation of the audio signal 110 into reference text 125. However, the respective language model 350 used in the translation of audio 110 may not be properly configured to (initially) translate certain topical words. For example, the language model 350 may not be able to recognize certain words in a translation of audio signal 110 because the language model 350 is not properly trained to recognize such words. The reference text 135 therefore may not be a good representation of a translation of the audio signal 110.

To address this potential problem, and to improve the accuracy of producing reference text 135 for subsequent translations and assessments, embodiments herein can include adapting the language model 350 based on one or more types of input 310. For example, adaptation manager 340 can receive input 310 in which to adapt or train the language model 350 for more accurate translation of audio signal 110 that potentially including the same spoken phrase as a previous translation. Thus, adaptation of the model 350 is useful.

In one embodiment, as mentioned, the transcription or translation accuracy of the reference text 135 is improved by adapting language model 350 associated with the speech recognition algorithm 112-1. In one embodiment, the adaptation manager 340 updates the language model 350 based on one or more type sequence of frames input 310. For example, input 310 can be:

a) Clean Archived Text: Transcripts of video broadcasts are typically available. When recent transcripts are used to adapt the language model 350, the language model 350 benefits from the vocabulary and phraseology of current topics (pertinent to the specific type of broadcast (e.g CBS™, MSNBC™, etc.);

b) Closed Caption Text (e.g., set of text 125): Though this may be the text under measurement or assessment, it sometimes includes useful information such as topical words (e.g., people names, current topics, names of countries, etc.) and can help augment the vocabulary of the base language model 350.

c.) Tele-prompter text, if available, also may be a useful source of information as it pertains to the vocabulary and phraseology of current topics.

Using adaptation manager 340 and input 310 to update the language model 350, embodiments herein are able to theoretically reduce the weighted error rate of the ASR transcription measured against a clean text reference from approximately 14% to 8% (~40% relative reduction).

In accordance with further embodiments, note that the weight set for automatic speech recognition error metric can be modified by de-emphasizing certain error categories where steno-captionists (e.g., human closed-caption translators) make fewer errors (e.g., some word insertions). This makes the translation quality metric 170 more resilient to automatic speech recognition errors in the reference text 135 for these categories. In other words, use of an adapted language model 350 for different translation categories can make it possible to use the speech recognition algorithm 112-1 to generate the reference text 135 as opposed to listening to the audio signal and manually (and laboriously) generating the respective reference text 135.

Figure 4:
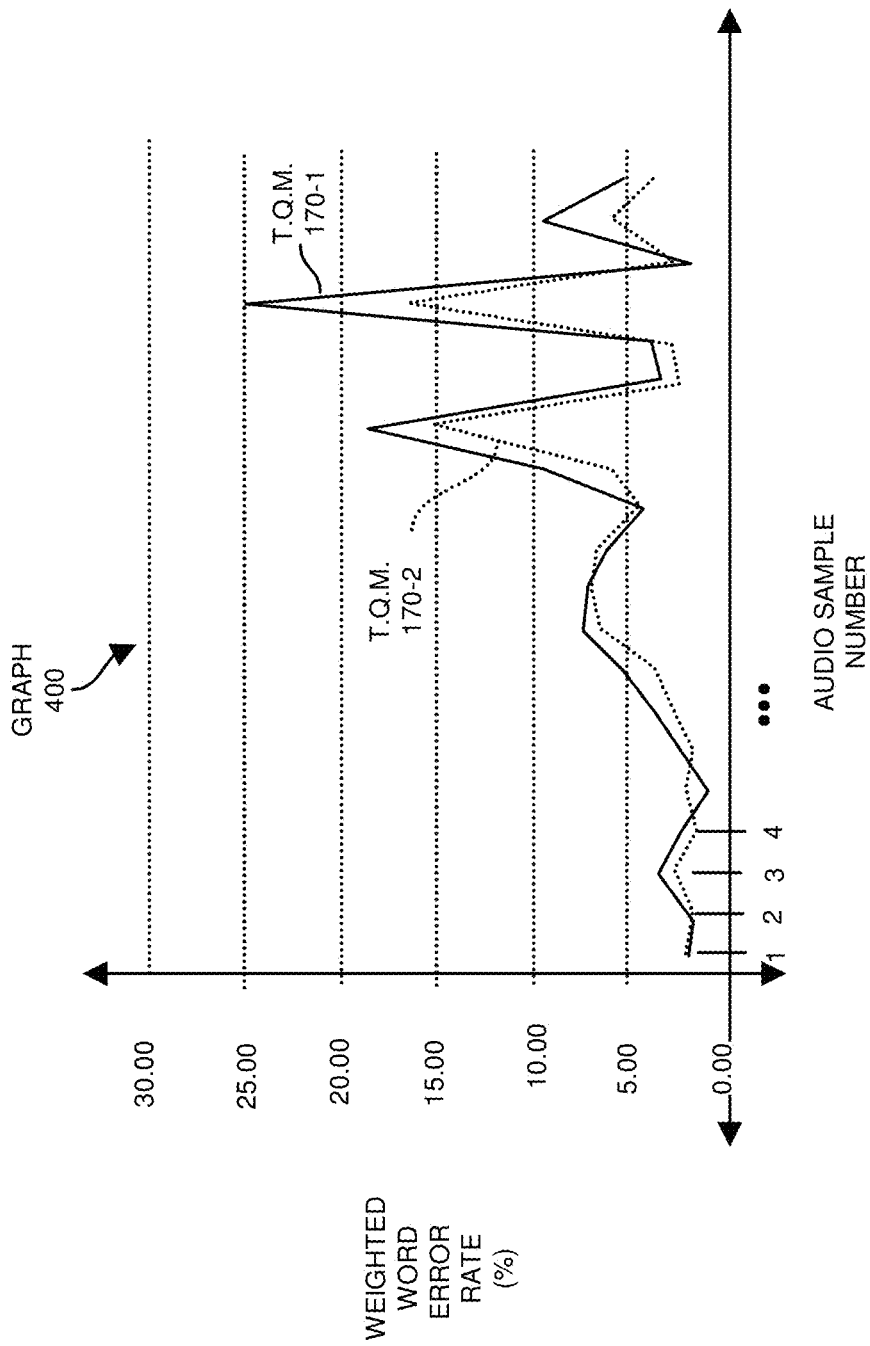
FIG. 4 is an example graph illustrating a hypothetical comparison of generation of a translation quality metric using different techniques according to embodiments herein.

FIG. 4 is an example diagram illustrating a graph 400 according to embodiments herein. In general, the graph 400 illustrates a comparison of samples of weighted word error rates (e.g., translation quality metrics) generated based on different reference text 135.

For example, translation quality metric 170-1 for the different samples is generated based on corresponding reference text 135 being derived from a manual or actual translation of the audio signal samples. The manual translation includes few if any errors, but is not necessarily desirable because it is labor intensive (i.e., it requires a lot of human labor to produce a translation).

Translation quality metric 170-2 for the different samples is generated based on corresponding reference text 135 derived based on translation using speech recognition algorithm 112-1 and adapted language model 350.

Thus, graph 400 presents the weighted closed caption word error rate for a host of programs (from different networks) using different reference text 135 (e.g., actual and automatic speech recognition algorithm). As shown, the two metrics 170 generally track each other closely when the error rates are low, but diverge at higher error rates. The divergence can be caused by translation of difficult audio where closed captionists tend to make more errors.

Embodiments herein can include setting a threshold value. Translation quality metric scores below the threshold value may be deemed acceptable. Translation quality metric scores above the threshold value can be flagged to indicate that a translation service provider needs to take a closer look at translation of audio for such programs because the quality of translation is poor.

Figure 5:
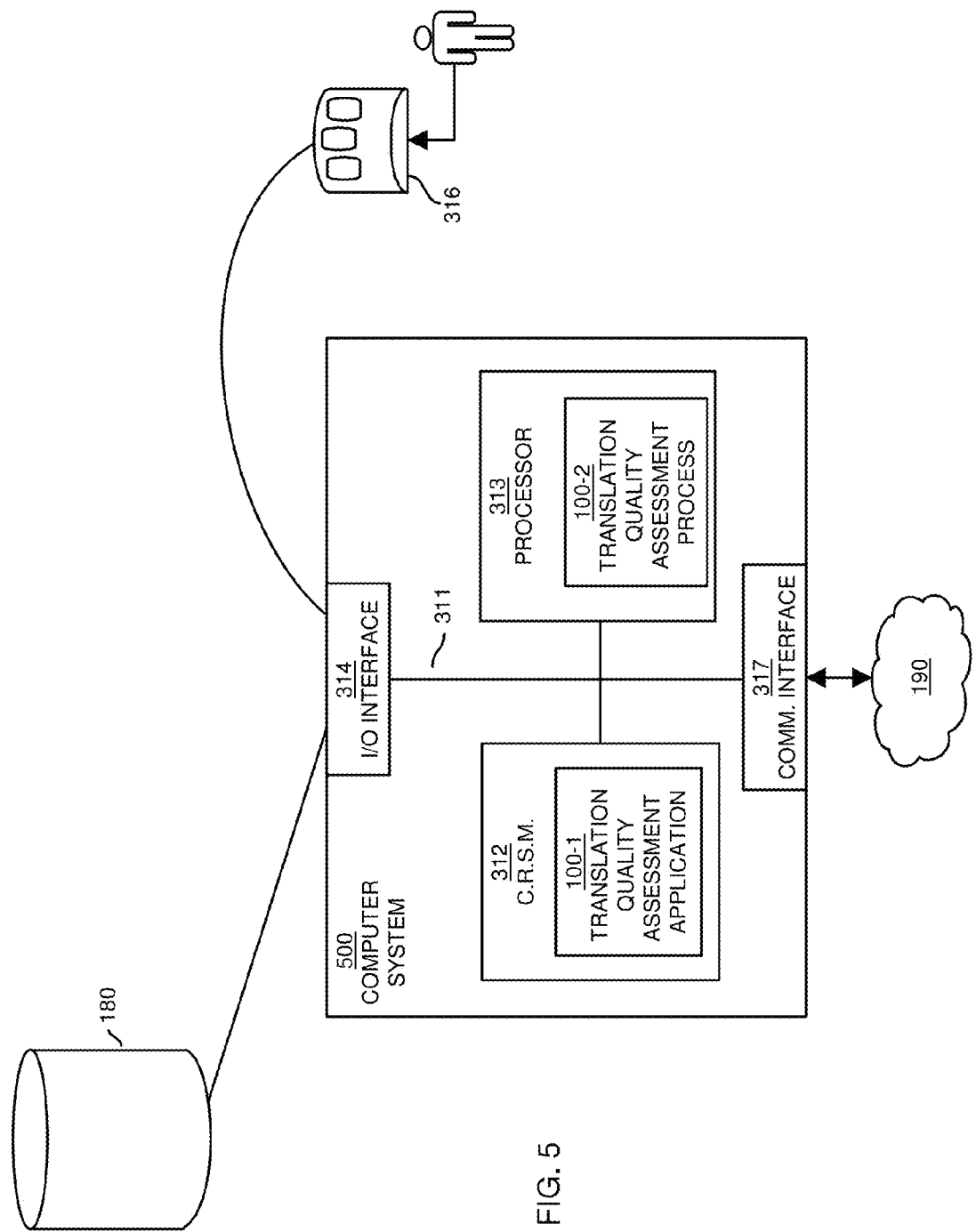
FIG. 5 is a diagram illustrating an example computer architecture for implementing a translation quality assessment system and related components according to embodiments herein.

FIG. 5 is an example block diagram of a computer system for implementing a translation quality assessment application (e.g., all or a portion of functions provided by translation quality assessment system 100) according to embodiments herein.

Computer system 500 can include one or more computerized devices such as a personal computer, workstation, portable computing device, console, network terminal, processing device, network device, etc., operating as a server, client, etc.

Note that the following discussion provides a basic embodiment indicating how to execute translation quality assessment system 100 according to embodiments herein. However, it should be noted that the actual configuration for carrying out the operations as described herein can vary depending on a respective application.

As shown, computer system 500 of the present example includes an interconnect 311 that couples computer readable storage media 312 such as a non-transitory type of computer readable storage media in which digital information can be stored and retrieved, a processor device 313, I/O interface 314, and a communications interface 317.

Repository 180 can store resources such as set of text 125, reference, text 135, error log 150, map 165, etc. I/O interface 314 provides connectivity to repository 180 and, if present, other devices such as display screen, peripheral devices 316, keyboard, computer mouse, etc.

Computer readable storage medium 312 can be any suitable device such as memory, optical storage, hard drive, floppy disk, etc. In one embodiment, the computer readable storage medium 312 is a non-transitory storage media (i.e., hardware storage media) configured to store instructions and/or data.

Communications interface 317 enables the computer system 500 and processor device 313 to communicate over a network 190 to retrieve information from remote sources and communicate with other computers. I/O interface 314 enables processor device 313 to retrieve respective information from repository 180.

As shown, computer readable storage media 312 can be encoded with translation quality assessment application 100-1 (e.g., software, firmware, etc.) executed by processor 313.

During operation of one embodiment, processor 313 accesses computer readable storage media 312 via the use of interconnect 311 in order to launch, run, execute, interpret or otherwise perform the instructions of translation quality assessment application 100-1 stored on computer readable storage medium 312. Translation quality assessment application 100-1 can include appropriate instructions, language models, analyzers, etc., to carry out any or all functionality associated with the translation quality assessment system 100 as discussed herein.

Execution of the translation quality assessment application 100-1 produces processing functionality such as translation quality assessment process 100-2 in processor 313. In other words, the translation quality assessment process 100-2 associated with processor device 313 represents one or more aspects of executing translation quality assessment application 100-1 within or upon the processor device 313 in the computer system 500.

Those skilled in the art will understand that the computer system 500 can include other processes and/or software and hardware components, such as an operating system that controls allocation and use of hardware resources to execute translation quality assessment application 100-1.

In accordance with different embodiments, note that computer system may be any of various types of devices, including, but not limited to, a personal computer system, desktop computer, laptop, notebook, netbook computer, mainframe computer system, handheld computer, workstation, network computer, application server, storage device, a consumer electronics device such as a camera, camcorder, set top box, mobile device, video game console, handheld video game device, a peripheral device such as a switch, modem, router, or in general any type of computing or electronic device.

Functionality supported by translation quality assessment system 100 will now be discussed via flowcharts in FIGS. 6-9. As discussed above, the speech recognition system 140 can be configured to execute the steps in the flowcharts as discussed below.

Note that there will be some overlap with respect to concepts discussed above for FIGS. 1 through 5. Also, note that the steps in the below flowcharts need not always be executed in the order shown. That is, the steps can be executed in any suitable order.

Figure 6:
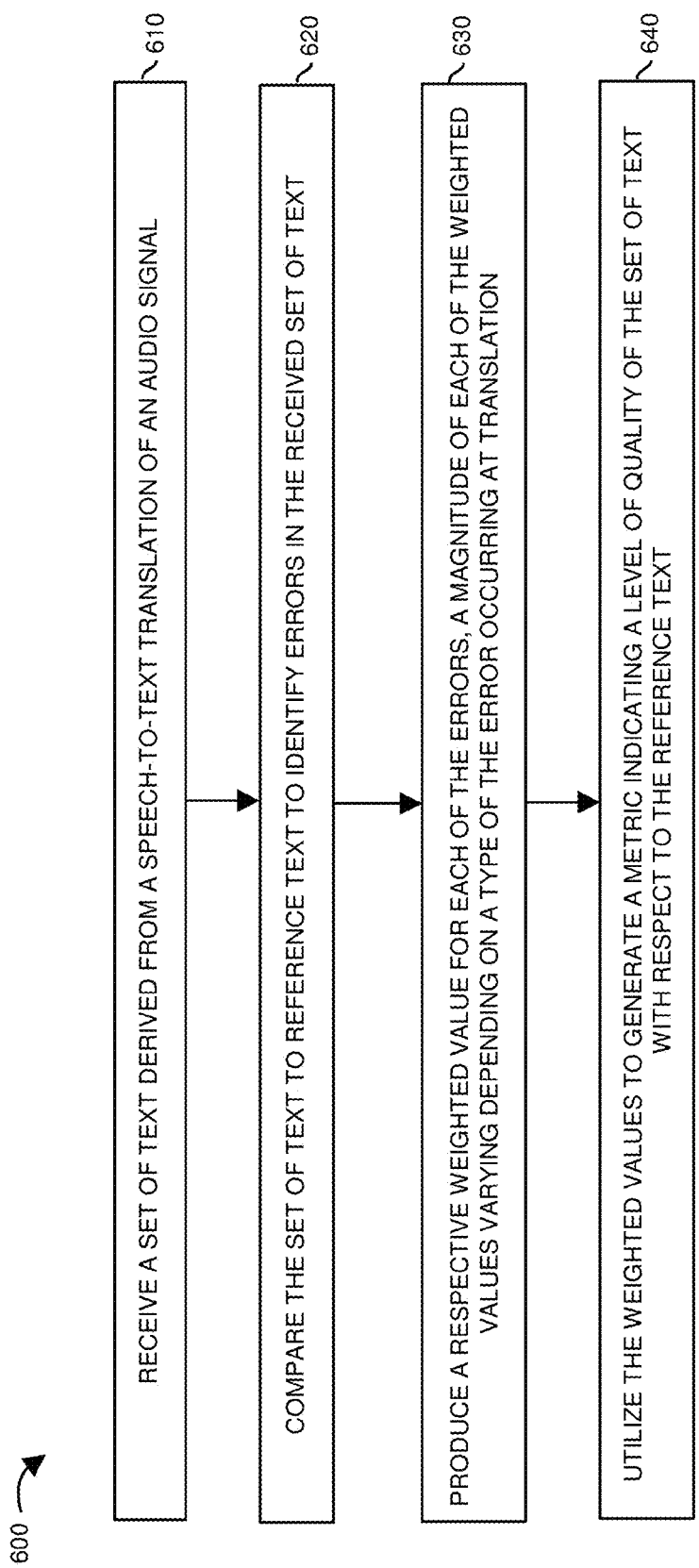
FIG. 6 is a flowchart illustrating an example method of implementing translation quality assessment and generation of a translation quality metric according to embodiments herein.

FIG. 6 is a flowchart 600 illustrating a general technique of implementing translation quality assessment system and generating a translation quality metric according to embodiments herein.

In step 610, the translation quality assessment system 100 receives a set of text 125 derived from a speech-to-text translation of audio signal 110.

In step 620, the translation quality assessment system 100 compares the set of text 125 to reference text 135 to identify errors in the received set of text 125.

In step 630, the translation quality assessment system 100 produces a respective weighted value for each of the detected errors. A magnitude of each of the weighted values varies depending on a type of the error occurring at translation.

In step 640, the translation quality assessment system 100 utilizes the weighted values to generate a metric (e.g., a novel weighted word error rate) as discussed herein indicating a level of quality of the set of text 125 with respect to the reference text 135.

Figure 7:
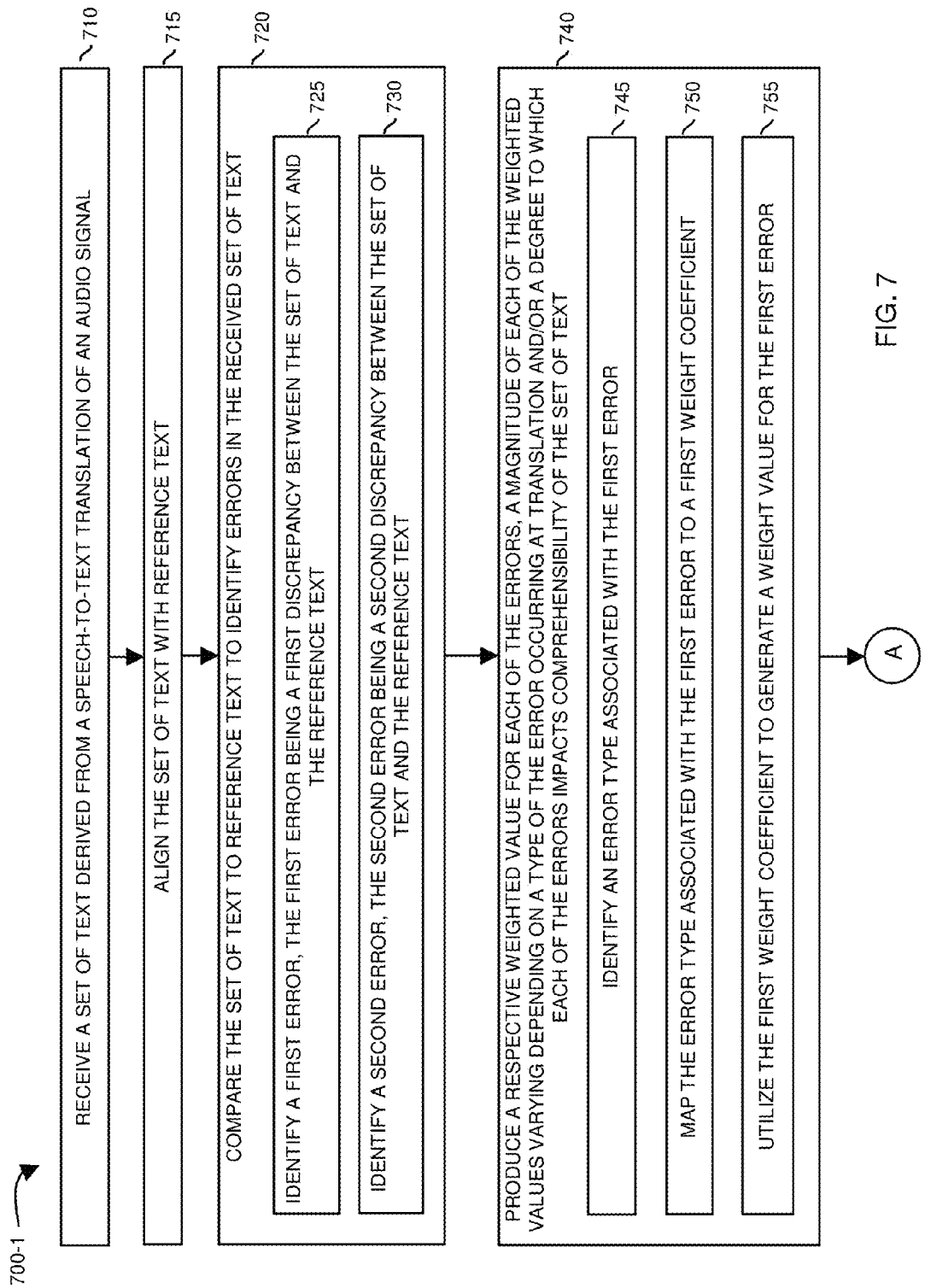
FIGS. 7 and 8 combine to form a flowchart illustrating an example method of implementing translation quality assessment and generation of a translation quality metric according to embodiments herein.
Figure 8:
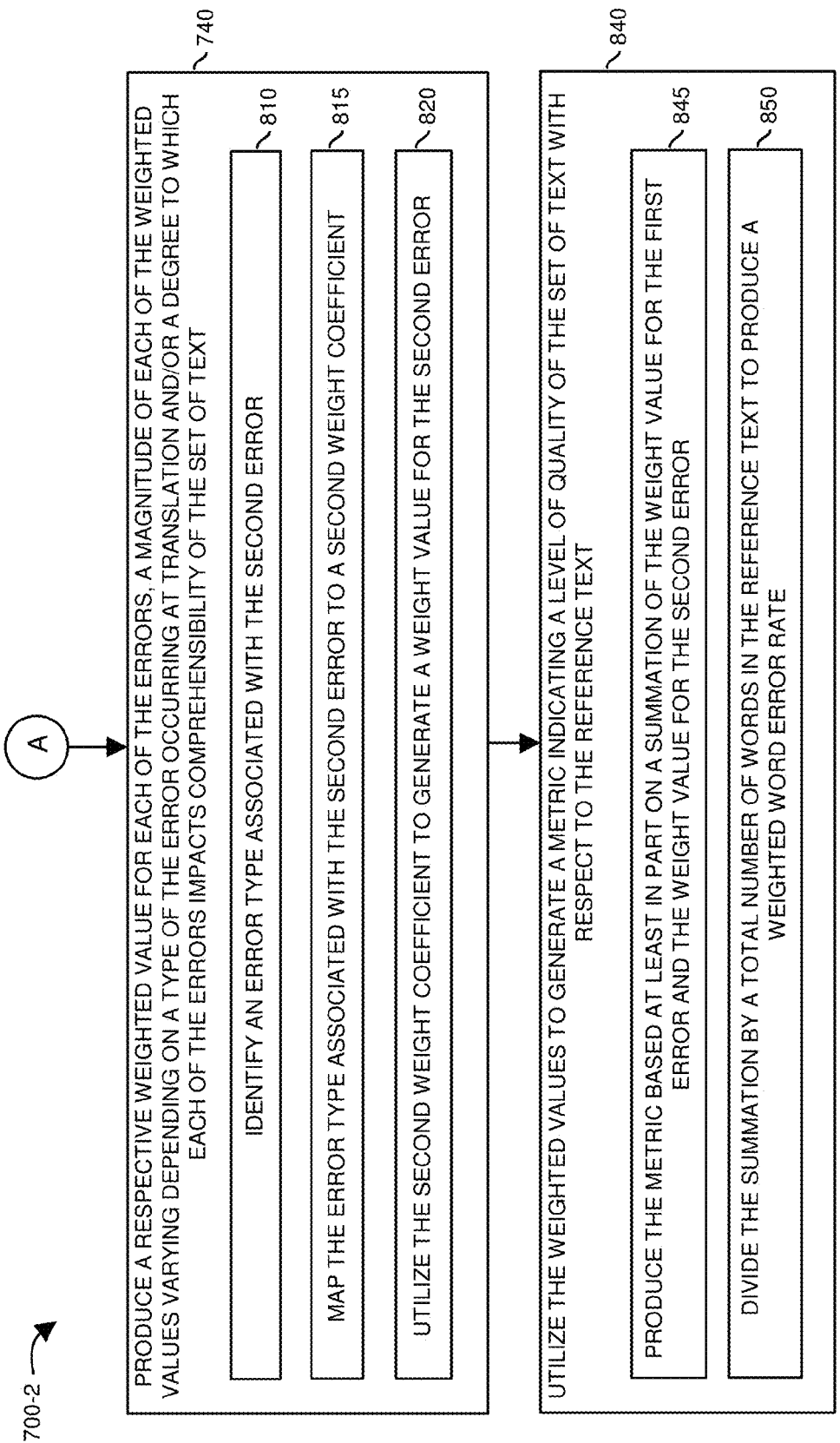

FIGS. 7 and 8 combine to form a flowchart 700 (e.g., flowchart 700-1 and flowchart 700-2) illustrating implementation of a translation quality assessment system 100 and generation of a weighted word error rate according to embodiments herein.

In step 710, the translation quality assessment system 100 receives a set of text 125 derived from a speech-to-text translation of audio signal 110.

In step 715, the translation quality assessment system 100 aligns the set of text 125 with reference text 135.

In step 720, the translation quality assessment system 100 compares the set of text 125 to reference text 135 to identify errors in the received set of text 125.

In sub-step 725, the translation quality assessment system 100 identifies a first error based on the comparison. The first error indicates a first discrepancy between the set of text 125 and the reference text 135.

In sub-step 730, the translation quality assessment system 100 identifies a second error based on the comparison. The second error indicates a second discrepancy between the set of text 125 and the reference text 135. In this manner, the translation quality assessment system 100 can identify any number of errors.

In step 740, the translation quality assessment system 100 produces a respective weighted value for each of the identified errors. As discussed herein, a magnitude of each of the weighted values can vary depending on a type of the error occurring at translation and/or a degree to which each of the errors impacts comprehensibility of the set of text.

In sub-step 745, the translation quality assessment system 100 identifies an error type associated with the first error.

In sub-step 750, the translation quality assessment system 100 maps the error type associated with the first error to a first weight coefficient in map 165.

In sub-step 755, the translation quality assessment system 100 utilizes the first weight coefficient to generate a weight value for the first error.

Further in step 740 of flowchart 700-2 in FIG. 8, in sub-step 810, the translation quality assessment system 100 identifies an error type associated with the second error.

In step 815, the translation quality assessment system 100 maps the error type associated with the second error to a second weight coefficient.

In step 820, the translation quality assessment system 100 utilizes the second weight coefficient to generate a weight value for the second error. In this manner, the translation quality assessment system 100 generates weighted values for each detected error.

In step 840, the translation quality assessment system 100 utilizes the weighted values to generate translation quality metric 170, which indicates a level of quality of the set of text 125 with respect to the reference text 135.

In step 845, the translation quality assessment system 100 produces the translation quality metric 170 based at least in part on a summation of the weight values for the first error and the second error as well as any other generated weighted value for detected errors.

In step 850, the translation quality assessment system 100 divides the summation (as produced in the previous step) by a total number of words in the reference text 135 (or set of text 125) to produce a weighted word error rate.

Figure 9:
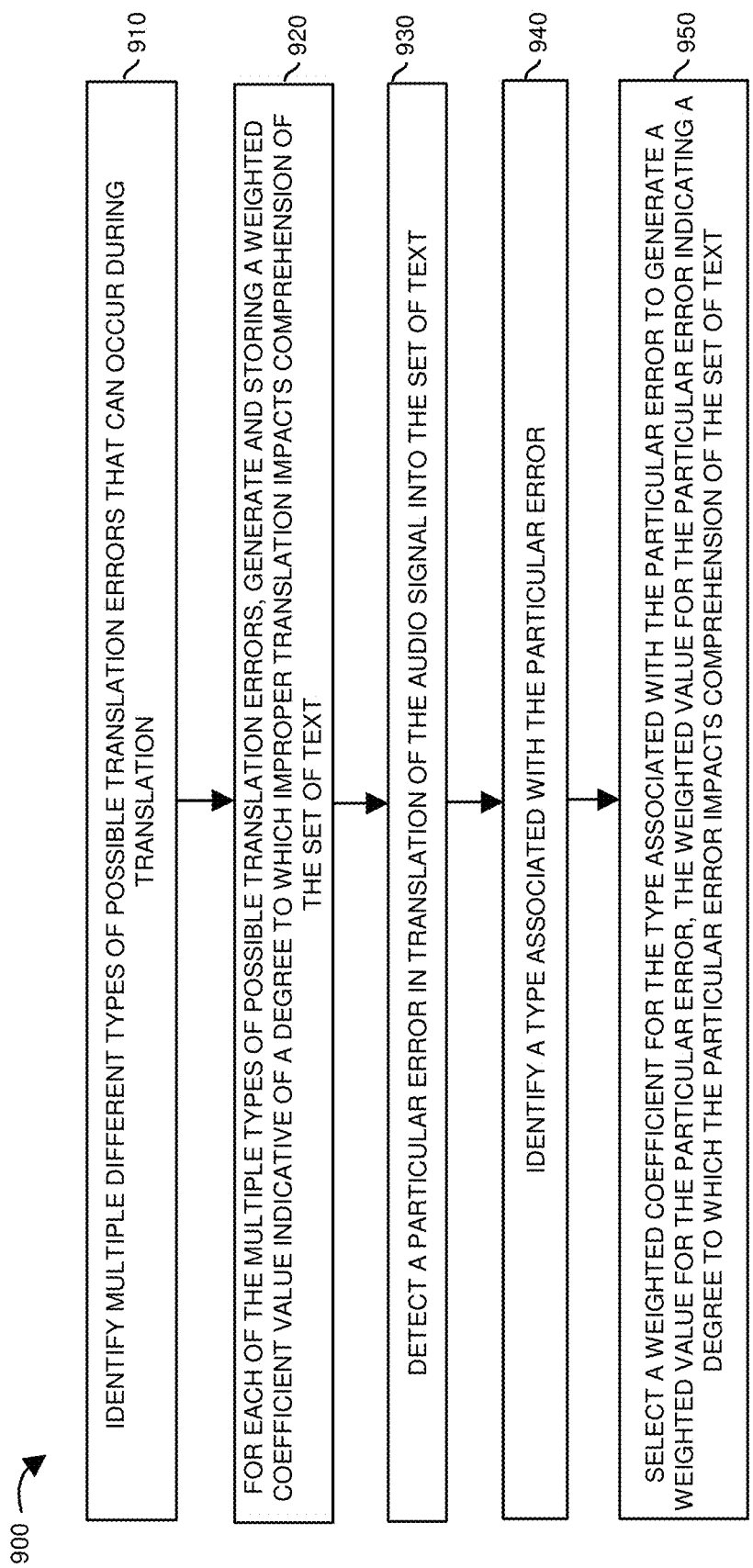
FIG. 9 is a flowchart illustrating an example method of implementing translation quality assessment and generation of a translation quality metric according to embodiments herein.

FIG. 9 is a flowchart 900 illustrating a general method of generating a weighted word error rate according to embodiments herein.

In step 910, the translation quality assessment system 100 identifies and/or receives information indicating multiple different types of possible translation errors that can occur during translation.

In step 920, for each of the multiple types of possible translation errors, the translation quality assessment system 100 generates and stores a weighted coefficient value indicative of a degree to which improper translation impacts comprehension of the set of text 125. The weighted coefficient values are stored in map 165.

In step 930, the translation quality assessment system 100 detects a particular error in translation of the audio signal 110 into the set of text 125.

In step 940, the translation quality assessment system 100 identifies a type associated with the particular error.

In step 950, the translation quality assessment system 100 utilizes map 165 to select a weighted coefficient for the type associated with the particular error to generate a weighted value for the particular error. As discussed herein, the weighted value for the particular error indicates a degree to which the particular translation error impacts comprehension of the set of text 125.

Based on the description set forth herein, numerous specific details have been set forth to provide a thorough understanding of claimed subject matter. However, it will be understood by those skilled in the art that claimed subject matter may be practiced without these specific details. In other instances, methods, apparatuses, systems, etc., that would be known by one of ordinary skill have not been described in detail so as not to obscure claimed subject matter. Some portions of the detailed description have been presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm as described herein, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing platform, such as a computer or a similar electronic computing device, that manipulates or transforms data represented as physical electronic or magnetic quantities within memories, registers, or other information storage devices, transmission devices, or display devices of the computing platform.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

What is claimed is:

1. A method comprising:
    receiving a set of text derived from a speech-to-text translation of an audio signal;
    comparing the set of text to reference text to identify errors in the received set of text;
    producing a respective weighted value for each of the identified errors, a magnitude of each of the weighted values varying depending on a type of the translation error; and
    utilizing the weighted values to generate a metric indicating a level of quality of the set of text with respect to the reference text.

2. The method as in claim 1, wherein the weighted values vary in magnitude depending on a degree to which each of the errors impacts comprehensibility of the set of text.

3. The method as in claim 1, wherein producing the respective weighted values includes:
    mapping the identified errors to weighted coefficients, the weighted coefficients varying in magnitude depending on a type associated with a respective error of the identified errors; and
    utilizing the weighted coefficients to produce the weighted values.

4. The method as in claim 1, wherein the errors include at least one type from the group consisting of:
    i) a word substitution type errors,
    ii) a word insertion type errors, and
    iii) a word omission type errors.

5. The method as in claim 1, wherein utilizing the weighted values to generate the metric includes:
    dividing a summation of the weighted values by the number of words in the reference text to produce the metric.

6. The method as in claim 1 further comprising:
    identifying multiple different types of possible translation errors that can occur during translation; and
    for each of the multiple types of possible translation errors, generating and storing a weighted coefficient value indicative of a degree to which improper translation impacts comprehension of the set of text.

7. The method as in claim 6 further comprising:
    detecting a particular error in translation of the audio signal into the set of text;
    identifying a type associated with the particular error; and
    selecting a weighted coefficient for the type associated with the particular error to generate a weighted value for the particular error, the weighted value for the particular error indicating a degree to which the particular error impacts comprehension of the set of text.

8. The method as in claim 7, wherein the set of text is a real-time transcription of the audio signal into the set of text, and wherein the set of text is configured for display as an overlay on video to which the audio signal pertains, the method further comprising:
    applying a speech-to-text converter algorithm to the audio signal, the speech-to-text converter algorithm converting the audio signal into the reference text.

9. The method as in claim 1 further comprising:
    prior to comparing, utilizing a speech recognition algorithm to convert the audio signal into the reference text.

10. The method as in claim 1, wherein the set of text is produced by a steno-captionist that converts the audio signal into the set of text; and
    wherein a speech recognition algorithm converts the audio signal into the reference text.

11. The method as in claim 1, wherein comparing the set of text to the reference text to identify errors in the received set of text includes:
    identifying a first error, the first error being a first discrepancy between the set of text and the reference text; and
    identifying a second error, the second error being a second discrepancy between the set of text and the reference text.

12. The method as in claim 11, wherein producing a respective weighted value for each of the errors includes:
    identifying an error type associated with the first error;
    mapping the error type associated with the first error to a first weight coefficient;
    utilizing the first weight coefficient to generate a weight value for the first error;
    identifying an error type associated with the second error, the error type associated with the second error being different than the error type associated with the first error;
    mapping the error type associated with the second error to a second weight coefficient, the second weight coefficient different in magnitude than the first weight coefficient; and
    utilizing the second weight coefficient to generate a weight value for the second error.

13. The method as in claim 12, wherein utilizing the weighted values to generate the metric includes:
    producing the metric based at least in part on a summation of the weight value for the first error and the weight value for the second error.

14. The method as in claim 13, wherein utilizing the weighted values to generate the metric includes:
    dividing the summation by a total number of words in the reference text to produce a weighted word error rate, the weighted word error rate taking into account different types of errors between the set of text and the reference text.

15. The method as in claim 14 further comprising:
    utilizing a speech recognition algorithm to convert the audio signal into the reference text; and
    adapting a language model of the speech recognition algorithm based on the identified errors in the set of text.

16. The method as in claim 1, wherein the reference text is a transcript of the audio signal, the method further comprising:
    adapting a language model of a speech recognition algorithm based on the identified errors in the set of text.

17. The method as in claim 1 further comprising:
    utilizing teleprompter text to adapt a language model of a speech recognition algorithm based on the identified errors in the set of text.

18. A computer-readable hardware storage medium having instructions stored thereon for processing data information, such that the instructions, when carried out by a processing device, cause the processing device to perform operations of:
    receiving a set of text derived from a speech-to-text translation of an audio signal;
    comparing the set of text to reference text to identify errors in the received set of text;

producing a respective weighted value for each of the errors, a magnitude of each of the weighted values varying depending on a type of the error occurring at translation; and utilizing the weighted values to generate a metric indicating a level of quality of the set of text with respect to the reference text.

19. The computer readable hardware storage medium as in claim 18, wherein the weighted values vary in magnitude depending on a degree to which each of the errors impacts comprehensibility of the set of text.

20. A computer system comprising:

a processor;

a memory unit that stores instructions associated with an application executed by the processor; and an interconnect coupling the processor and the memory unit, the interconnect enabling the computer system to execute the application and perform operations of:

receiving a set of text derived from a speech-to-text translation of an audio signal;

comparing the set of text to reference text to identify errors in the received set of text;

producing a respective weighted value for each of the errors, a magnitude of each of the weighted values varying depending on a type of the error occurring at translation; and utilizing the weighted values to generate a metric indicating a level of quality of the set of text with respect to the reference text.

21. The method as in claim 1, wherein the set of text is a set of closed-captioned text generated by a steno-captionist in real-time for playback with respective video to which the set of closed-caption text pertains.

22. The method as in claim 21, wherein the reference text represents a better speech-to-text translation of the audio signal than does the set of closed-captioned text.

* * * * *